United States Patent
Tanaka et al.

(10) Patent No.: US 6,513,035 B1
(45) Date of Patent: Jan. 28, 2003

(54) DATABASE SEARCH APPARATUS AND METHOD

(75) Inventors: Keisuke Tanaka, Asaka (JP); Yoshinori Ohta, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/534,310

(22) Filed: Mar. 23, 2000

(30) Foreign Application Priority Data

Mar. 24, 1999 (JP) .......................................... P11-079570

(51) Int. Cl.[7] .............................................. G06F 17/30
(52) U.S. Cl. .......................................................... 707/3
(58) Field of Search ................................ 707/2, 3, 5, 6, 707/100, 102, 104.1; 345/156, 700, 835, 846; 382/209, 232, 233

(56) References Cited

U.S. PATENT DOCUMENTS

| | | | | |
|---|---|---|---|---|
| 5,751,286 A | * | 5/1998 | Barber et al. | 345/835 |
| 6,167,382 A | * | 12/2000 | Sparks et al. | 705/14 |
| 6,301,586 B1 | * | 10/2001 | Yang et al. | 705/27 |

* cited by examiner

*Primary Examiner*—Diane D. Mizrahi
*Assistant Examiner*—Apu Mofiz
(74) *Attorney, Agent, or Firm*—McGinn & Gibb, PLLC

(57) ABSTRACT

When a group keyword is input to a group keyword setting area on a display screen and a grouping area is clicked, a grouping search command is applied to an image database system. Data belonging to the group keyword is retrieved from the database and representative images are displayed in a thumbnail image display area. When a thumbnail image is clicked, data belonging to the group represented by this representative image is displayed. This makes it possible to find a desired image in a comparatively simple manner.

11 Claims, 20 Drawing Sheets

Fig.3

SET SEARCH CONDITIONS

| SEARCH ALL | ITEM SEARCH |

REGISTRATION DATE [ ] ~ ▼ [ ] ← A1

PRODUCT CATEGORY [ ] MATCH ▼

MANUFACTURE NAME [ ] MATCH ▼

PRODUCT NAME [ ] MATCH ▼

PRODUCT FEATURES [ ] MATCH ▼

WEIGHT [ 1000 ] ~ ▼ [ ]

SALES DATE [ 1997/1/1 ] ~ ▼ [ ]

JOIN CONDITION ● AND ○ OR ← A3

GROUP KEYWORD [ ▼ ]
                          ↖ A4

LIST-DISPLAY COUNT [ 5 ▼ ]
                   ↖ A5

A6 ↘ SEARCH

Fig.7

| | LIST OF SEARCH RESULTS | | |
|---|---|---|---|
| GROUP KEYWORD | NONE ▼ GROUPING | | |
| GROUPING HISTORY | PRODUCT CATEGORY : PRINTER ; MANUFACTURE NAME: AAA ELECTRIC CO. | | |

| THUMBNAIL IMAGES | PRODUCT NAME | FEATURES | WEIGHT |
|---|---|---|---|
| | A-700 | TA SYSTEM | 15800 |
| | A-500 | TA SYSTEM | 15500 |
| | A-300 | TA SYSTEM | 6400 |
| | A-300P | TA SYSTEM | 32800 |
| | AP-1000 | TA SYSTEM | 48500 |

◀◀ ◀ 1/30 ▶ ▶▶        BACK

Fig. 15

| WINDOW | SEARCH CONDITIONS ||||| GROUPING HISTORY || GROUP KEYWORD |
| --- | --- | --- | --- | --- | --- | --- | --- | --- |
| | COLUMN NAME | MAIN VALUE | SUBORDINATE VALUE | OPERATOR | JOIN CONDITION | COLUMN NAME | VALUE | |
| FIG. 3 | | | | | | | | |
| FIG. 4 | SALES DATE<br>WEIGHT | 1997/01/01<br>1000 | | <=<br><= | AND<br>AND | NOTHING | NOTHING | NOTHING |
| FIG. 5 | SALES DATE<br>WEIGHT | 1997/01/01<br>1000 | | <=<br><= | AND<br>AND | NOTHING | NOTHING | PRODUCT CATEGORY |
| FIG. 6 | SALES DATE<br>WEIGHT<br>PRODUCT CATEGORY | 1997/01/01<br>1000<br>PRINTER | | <=<br><=<br>= | AND<br>AND<br>AND | PRODUCT CATEGORY | PRINTER | MANUFACTURER NAME |
| FIG. 7 | SALES DATE<br>WEIGHT<br>PRODUCT CATEGORY<br>MANUFACTURER NAME | 1997/01/01<br>1000<br>PRINTER<br>AAA ELECTRIC CO. | | <=<br><=<br>=<br>= | AND<br>AND<br>AND<br>AND | PRODUCT CATEGORY<br>MANUFACTURER NAME | PRINTER<br>AAA ELECTRIC CO. | NOTHING |

Fig. 16

| | THUMBNAIL IMAGES | PRODUCT CATEGORY | MANUFACTURE NAME | PRODUCT NAME | FEATURES |
|---|---|---|---|---|---|
| A71 | FL 15815 | PRINTER | AAA ELECTRIC CO. | 123A | TA SYSTEM |
| A72 | FL 54 | CAMERA | BBB CAMERA CO. | B-123 | MEGAPIXEL |
| A73 | | PRINTER | CCC MACHINE CO. | C-500 | INK JET |
| A74 | 2580 | PRINTER | DDD ELECTRIC CO. | 600D | PHOTO-GRAPHIC |
| | | MONITOR | EEE ELECTRIC CO. | 3E | FLATBED |

LIST OF SEARCH RESULTS — A11, A12
GROUP KEYWORD: MANUFACTURE NAME ▼ (GROUPING)
GROUPING HISTORY: PRODUCT CATEGORY
A13, A18, A14, A15, A16, A17
BACK — A21
1/200 — A33
A35, A34, A31, A32

DATABASE SEARCH APPARATUS AND METHOD

BACKGROUND OF THE INVENTION

1. Field of the Invention

This invention relates to a database search apparatus and method for searching a database in which a large number of items have been stored and displaying the result of the search on a display unit.

2. Description of the Related Art

An image database is for obtaining a desired image by randomly displaying, on a display unit, thumbnail images of images obtained by searching the image database and designating a thumbnail image displayed.

However, if the images retrieved by the search of the image database are large in number, then a large number of thumbnail images will be displayed randomly on the image display unit. This makes it difficult to find a desired image among the large number of thumbnail images displayed.

Further, collections of image materials include those obtained by forming a plurality of folders in advance and storing a large number of images in the plurality of folders upon classifying the images according to image type.

Unless the name of a folder appropriately represents the images represented by the image data that has been stored in the folder, the desired image will not be contained in the folder even if the folder is specified. Thus, finding the desired image is difficult. Further, if image data representing a large number of images has been stored in a folder, it is still difficult to find a desired image among these numerous images.

DISCLOSURE OF THE INVENTION

Accordingly, an object of the present invention is to arrange it so that a desired image can be found in a comparatively simple manner.

A database search apparatus according to a first aspect of the present invention comprises: a group keyword input unit for inputting a group keyword; a search unit (search means), which is responsive to a group keyword that has been provided by the group keyword input means, for searching a database in which numerous items of data have been stored and finding representative image data that represents a representative image of extracted data; and a representative-image display control unit (representative-image display control means) for displaying, on a display unit, the representative image represented by the representative image data found by the search unit.

The first aspect of the present invention provides also a method suitable for the apparatus described above. Specifically, the method comprises the steps of: inputting a group keyword; searching, in response to input of a group keyword, a database in which numerous items of image data have been stored and finding a representative image that represents a representative image of extracted data; and displaying, on a display unit, the representative image represented by the representative image data found.

In accordance with the first aspect of the present invention, the database is searched when a group keyword is entered. The data that has been stored in the database is extracted in accordance with the group keyword and representative images regarding the extracted data are displayed on the display unit. By repeatedly entering group keywords, the search is repeated to obtain the desired image.

Thus, a desired image can be found with relative ease even if a large number of items of data have been stored in the database.

Since the representative images are displayed on the display unit, the content of data obtained by providing the group keyword can be ascertained merely by observing the representative images.

Preferably, it is determined whether the extracted data is a plurality of items of data and, in response to a determination to the effect that the extracted data is plural, a representative image indicating that the extracted data is plural is displayed on the display unit.

Thus, merely observing the representative image makes it possible to ascertain that the data retrieved by the search of the database is plural.

A count of retrieved items of data may be displayed on the display unit.

Thus, one can ascertain the number of items of data retrieved. This makes it possible for the user to judge whether the data that is the object of the search should be narrowed down further by providing a group keyword.

An arrangement may be adopted in which the number of retrieved items of data is not displayed if the number is one but is displayed if the number of items of retrieved data is plural. Thus, whether the number of items of retrieved data is one or plural can be distinguished comparatively simply.

An arrangement may be adopted in which information relating to the representative image (e.g., if the representative image is the image of a product, then the information would represent a feature of the product) is displayed on the display unit in association with the representative image. This makes it possible to ascertain not only the representative image but also other related information.

An arrangement may be adopted in which an image corresponding to data represented by a representative image is displayed on the display unit in response to the representative image being clicked.

Thus, even a user who is not accustomed to operating a database can obtain, in comparatively simple fashion, an image belonging to a group decided by a group keyword.

A group for which details are to be displayed may be designated and, in response to the designation made, images represented by the data belonging to the designated group may be displayed as a list.

Thus, images corresponding to the data belonging to a group can be viewed.

Information relating to the images displayed in the list may be displayed on the display unit.

Thus, even more detailed information concerning images corresponding to the data can be acquired.

A database search apparatus according to a second aspect of the present invention comprises: a search condition input unit for inputting search conditions; a search unit (search means) for searching a database, in which numerous items of data have been stored, in accordance with search conditions that have been input from the search condition input unit; a display control unit (display control means) for displaying, on a display unit, a representative image representing results of searching the database by the search unit; and a unit (means) for changing the form of the representative image in dependence upon the results of searching the database by the search unit (e.g., the number of hits resulting from the search).

The second aspect of the present invention provides also a method suitable for the apparatus described above.

Specifically, the method comprises the steps of: inputting search conditions; searching, in accordance with search conditions that have been input, a database in which numerous items of data have been stored; displaying, on a display unit, a representative image representing results of searching the database; and changing the form of the representative image in dependence upon the results of searching the database.

In accordance with the second aspect of the present invention, the form of the representative image is changed in dependence upon the results of searching the database.

Thus, the user can infer search results merely by observing the form of the representative image. For example, if the number of hits resulting from a search is large, a representative image of the kind in which many images are superimposed is displayed.

The form of the representative image may be changed as the number of hits increases. This makes it possible to surmise how many hits have been obtained.

The representative image may be constructed by pasting an image onto a template image. In such case it is preferred that color transformation processing be executed in such a manner that the color of part of the area of the template image will become the same as a background color.

If the template image is expressed in accordance with the standard of the JPEG (Joint Photographic coding Experts Group), the template image will be rendered rectangular. If the GIF (Graphic Interchange Format) is employed, a template image of any shape can be formed but the image can be expressed in only 256 colors.

Since color transformation processing is executed in such a manner that the color of part of the template image becomes the same as the color of the background, the color in the area of this portion will become a color the same as that of the background even if the template image is produced in accordance with the JPEG standard. Thus, a template image having any shape is formed. This makes it possible to form a representative image having any desired shape.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3 to 9 illustrate examples of search-condition setting windows displayed on a display unit of a client computer;

FIG. 15 is a status table showing the status of search conditions, grouping history and group keywords;

FIG. 16 is a search-result list window displayed on the display unit of the client computer;

DESCRIPTION OF THE PREFERRED EMBODIMENT

A preferred embodiment of the present invention will now be described in detail with reference to the drawings.

Figure 1:
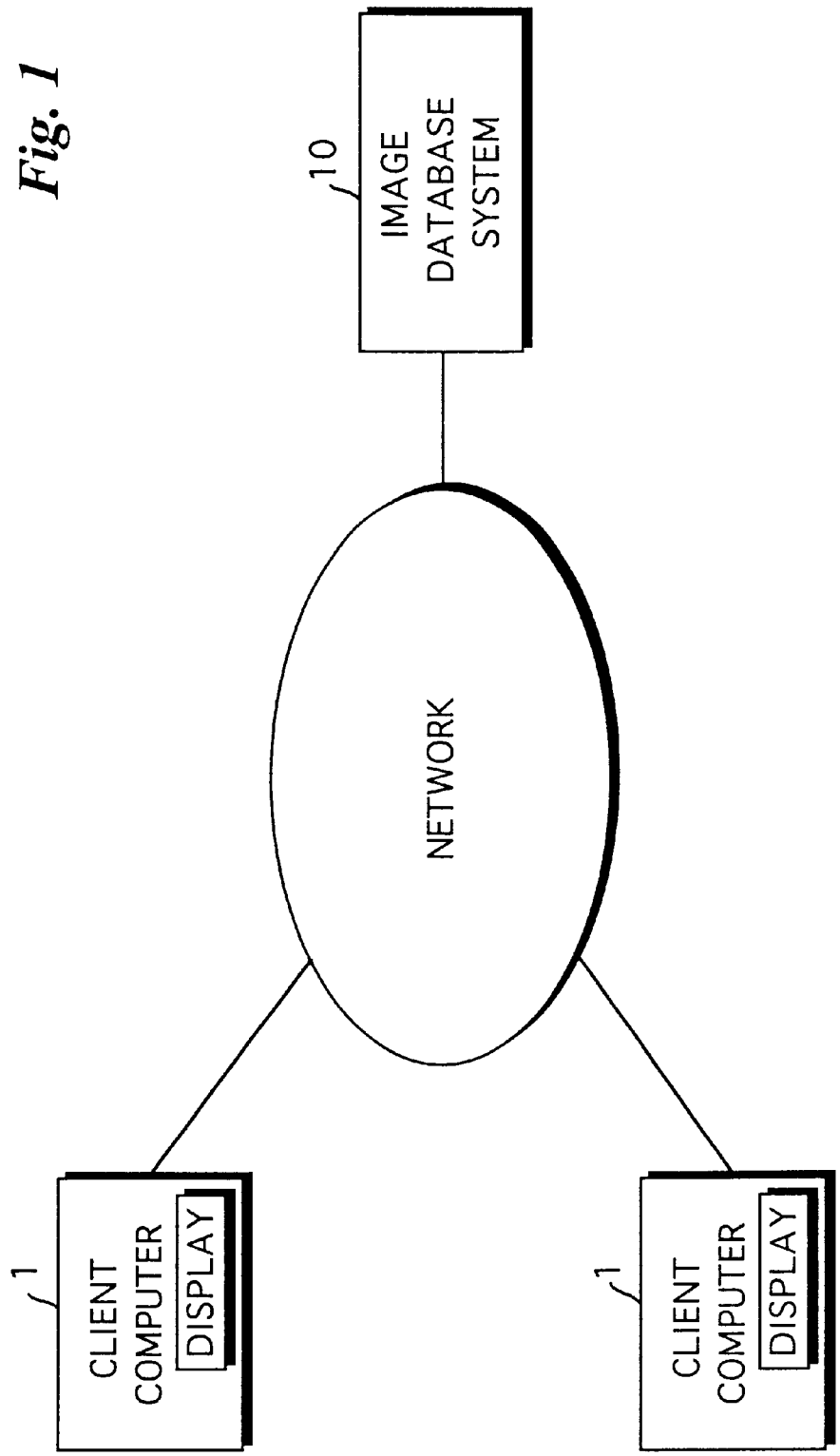
FIG. 1 illustrates an overview of an image data communication system.

FIG. 1 illustrates an overview of an image data communication system according to a preferred embodiment of the present invention.

As shown in FIG. 1, the image data communication system comprises a client computer 1 and an image database system 10. The client computer 1 and image database system 10 are capable of communicating data with each other via a network such as the Internet.

In the image data communication system illustrated, search conditions are transmitted from the client computer 1 to the image database system 10.

When the image database system 10 receives search conditions transmitted from the client computer 1, processing for searching data in accordance with the search conditions is executed. Data found by the search is transmitted from the image database system 10 to the client computer 1.

The client computer 1 employed is a personal computer capable of communicating via a network and includes a display unit.

Figure 2:
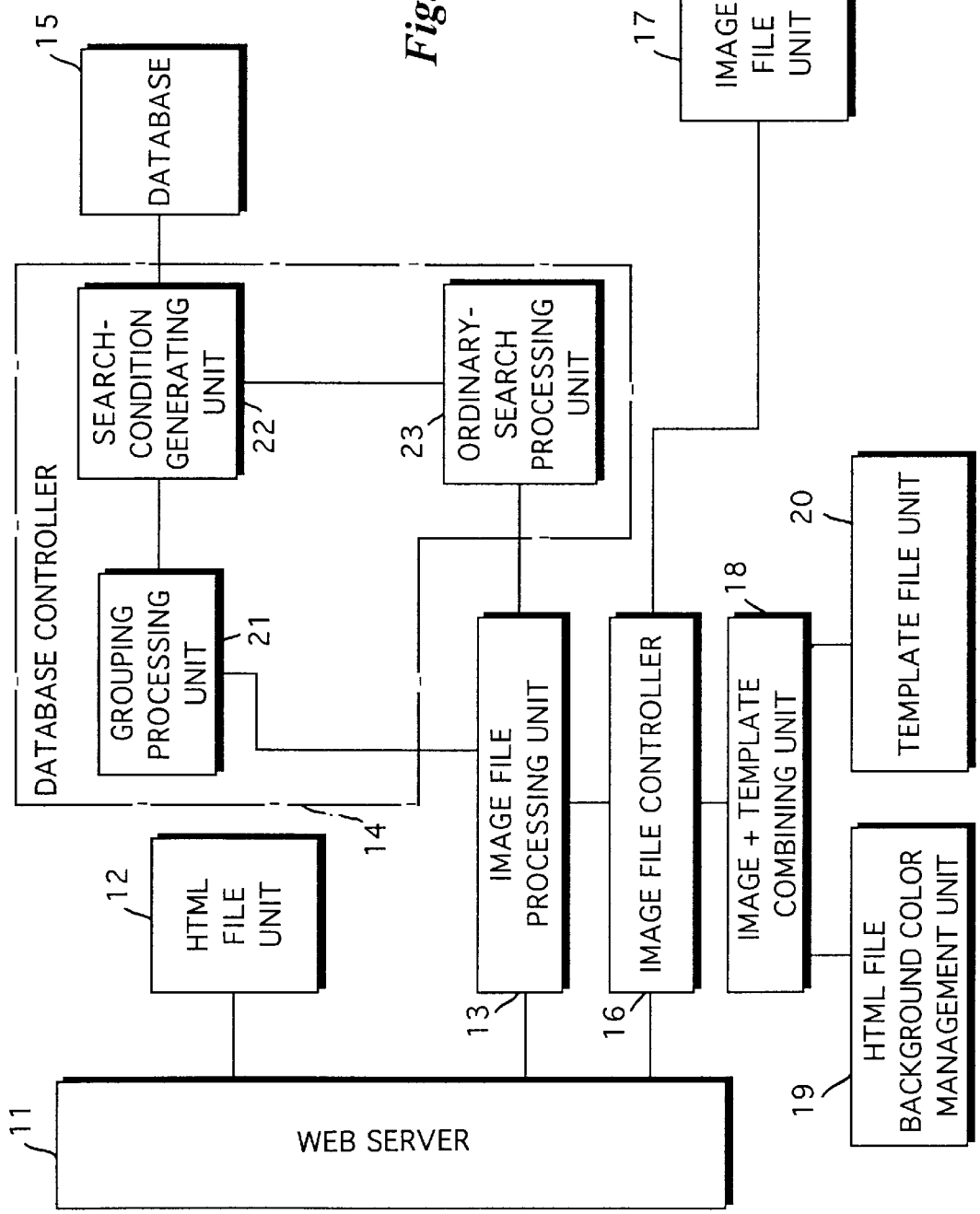
FIG. 2 is a block diagram showing the electrical construction of an image database system.

FIG. 2 is a block diagram illustrating the electrical construction of the image database system 10.

As shown in FIG. 2, the image database system 10 includes a Web server 11. The latter includes a CPU, a memory, a CD-ROM (compact disc—read-only memory) drive and a display unit, etc.

The image database system 10 further includes an HTML (HyperText Markup Language) file unit 12 in which data for displaying HTML pages has been stored; a database 15 for storing various data; a database controller 14 for searching various data that has been stored in the database 15; an image file unit 17 for storing image data; an image file controller 16 for controlling storage of image data to and read-out of image data from the image file unit 17; and an image file processing unit 13 for controlling overall operation of the image database system 10.

The image database system 10 further includes an image+template combining unit 18 for combining a prescribed image and a template image; an HTML file background color management unit 19 for managing the background color of a thumbnail display area in a window listing the results of a search, described later; and a template file unit 20 for storing image data representing a template image.

The database controller 14 includes a search-condition generating unit 22 for generating an SQL (Structured Query Language) statement; a grouping processing unit 21 for applying an SQL-statement generating command to the search-condition generating unit 22 at the time of a grouping search, as will be described later; and an ordinary-search processing unit 23 for applying an SQL-statement generating command to the search-condition generating unit 22 when a search (referred to as an "ordinary search") other than a grouping search is conducted.

FIGS. 3 to 9 illustrate examples of windows displayed on the display unit of the client computer 1. FIG. 10 is a status transition diagram showing the transition of windows displayed on the display unit of the client computer 1. FIGS. 11 to 14 are flowcharts illustrating processing in the image database system. Identical processing steps in these flowcharts are designated by like step numbers. FIG. 15 is a status table showing the status of search conditions, grouping history and group keywords.

A search-condition setting window shown in FIG. 3 is displayed on the display unit of the client computer 1. The Window has the Following Areas:

Search-condition Setting Area A1:

In the example depicted in FIG. 3, registration date, product category, manufacturer name, product name, product features, weight and sales date are the column names of search conditions. Values corresponding to these column names are entered as search conditions in a setting area A1.

Join-condition Setting Area A3:

This is an area which sets a join condition for conducting an AND search or OR search of search conditions that have been entered in the search-condition setting area A1.

Group Keyword Setting Area A4:

This is an area in which a group keyword is entered by the user of the client computer 1 when a grouping search is conducted, as will be described later.

List-display Count Setting Area A5:

This is an area for setting the number of images, which have been obtained by a search, to be displayed at one time on the display screen of the display unit.

Search Area A6:

This is an area clicked by the user when a command for searching image data in the image database system 10 is applied under the search conditions that have been set.

If the search area A6 in the search-condition setting window of FIG. 3 is clicked by the user when "NONE" has been entered in the group keyword setting area A4, the search command and the search conditions are transmitted from the client computer 1 to the image database system 10.

Figure 11:
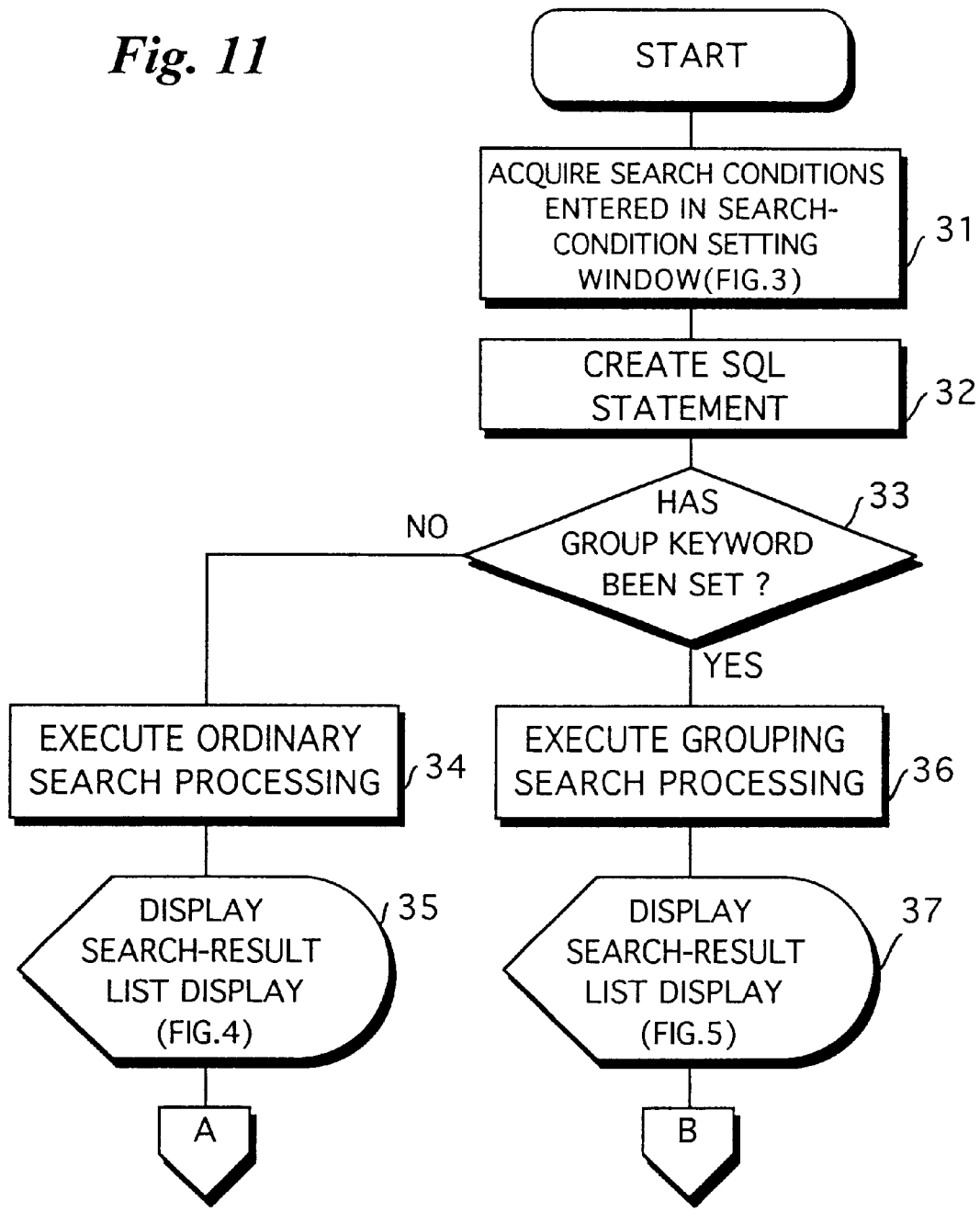
FIGS. 11 to 14 are flowcharts illustrating processing for displaying results of searching a database.

The search conditions are received at the Web server 11 of the image database system 10 (step 31 in FIG. 11). The search conditions are applied to the search-condition generating unit 22 of the database controller 14 via the image file processing unit 13. The search-condition generating unit 22 generates an SQL statement (step 32). Processing for searching the database 15 is executed at step 34. (Here it is assumed that a group keyword has not been set in the group keyword setting area A4. Accordingly, an ordinary search is conducted.)

The data representing the results of the search is transmitted from the image database system 10 to the client computer 1. A window of the kind shown in FIG. 4 representing a list of search results is displayed on the display unit of the client computer 1 (step 35).

Figure 4:
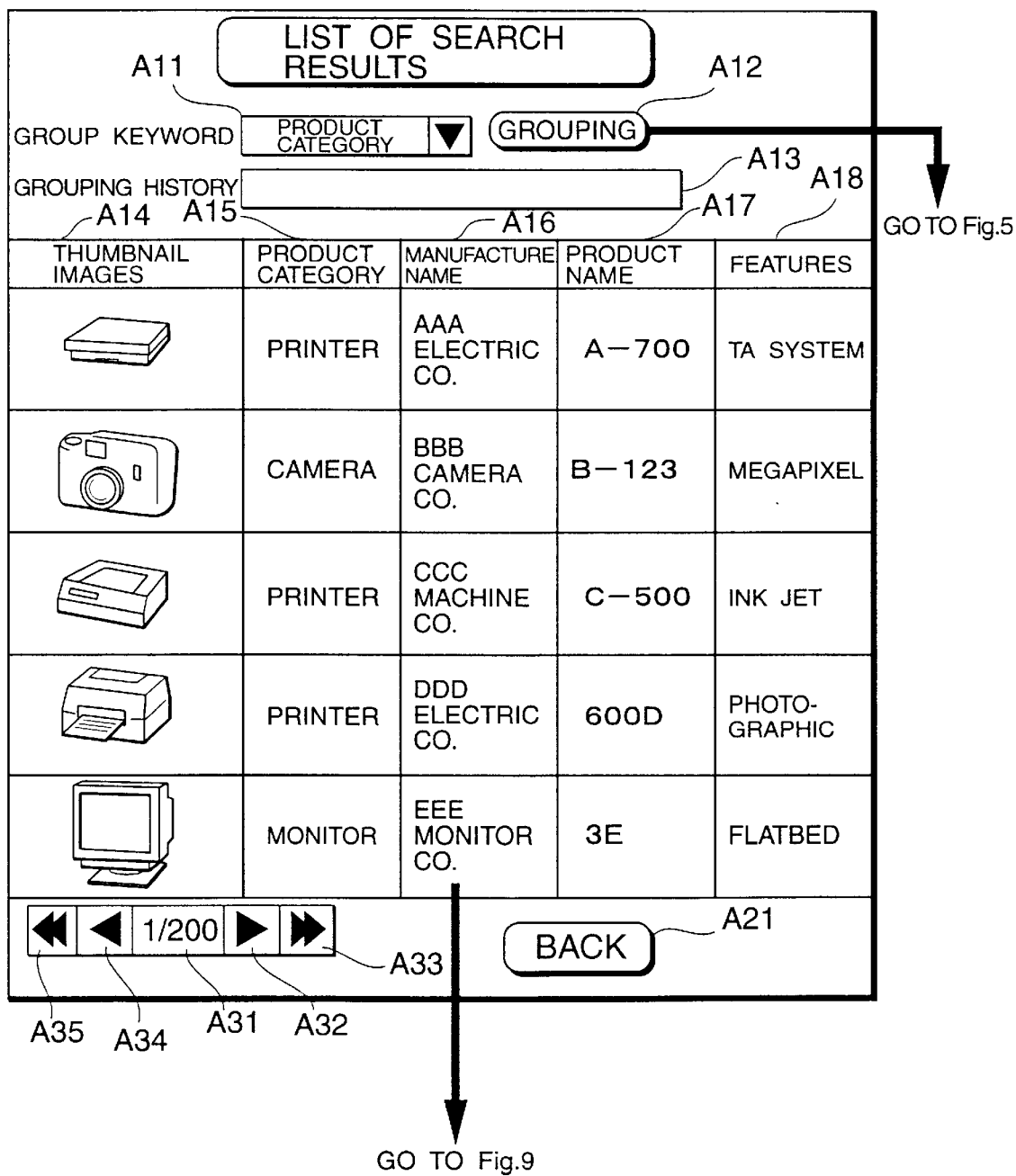

The window shown in FIG. 4 displaying a list of search results includes the following areas:

Group Keyword Setting Area A11:

This is an area in which the user of the client computer 1 enters a group keyword.

Grouping Area A12:

This is an area clicked by the user when a grouping search command is applied to the image database system 10.

Grouping History Display Area A13:

If a group keyword has been entered to conduct a grouping search, this area displays a history of group keywords entered.

Thumbnail Image Display Area A14:

This area displays thumbnail images of images represented by image data that has been obtained by a search of the image database system 10.

Field Display Areas A15 to A18:

Data corresponding to a thumbnail image being displayed in the thumbnail image display area A14 is displayed in these areas on a per-field (per-search-condition) basis. Area A15 is for displaying a product category, A16 for displaying the name of the manufacturer, A17 for displaying the name of the product and A18 for displaying a feature of the product.

Page Display Area A31:

The number of a page being displayed in the search-result display window is indicated in this area.

Single-page Advance Area A32:

When a page being displayed in the search-result list window is to be advanced by one page, this area is clicked by the user.

Plural-page Advance Area A33:

When a page being displayed in the search-result list window is to be advanced by a plurality of pages, this area is clicked by the user.

Single-page Return Area A34:

When a page being displayed in the search-result list window is to be turned back by one page, this area is clicked by the user.

Plural-Page Advance Area A35:

When a page being displayed in the search-result list window is to be turned back by a plurality of pages, this area is clicked by the user.

Back Area A21:

This is an area clicked by the user when the previous window is to be displayed on the display unit.

If a group keyword is entered in the group keyword setting area A11 and the grouping area A12 is clicked in the search-result list window of FIG. 4 (step 38), the group keyword and a grouping search command are transmitted from the client computer 1 to the image database system 10.

The group keyword is applied to the image file processing unit 13 of the image database system 10 (step 42). Since the group keyword has been entered in the group keyword setting area A11, the grouping processing unit 21 applies the group search command to the search-condition generating unit 22 (step 43). The search-condition generating unit 22 generates an SQL statement (step 44) and a grouping search processing is executed (step 45).

The number of data hits that apply to the given group keyword and the file names of representative images regarding the applicable data are obtained by searching the database 15 (step 46). The database 15 is searched again in accordance with the obtained file names of the representative images and detailed information regarding the products represented by the representative images are obtained (step 47).

The representative image files having the file names of the representative images are read out of the image file unit 17 by the image file controller 16. The representative image files, the detailed information regarding the products represented by the representative images and the numbers of hits are transmitted to the client computer 1 by the Web server 11.

Figure 5:
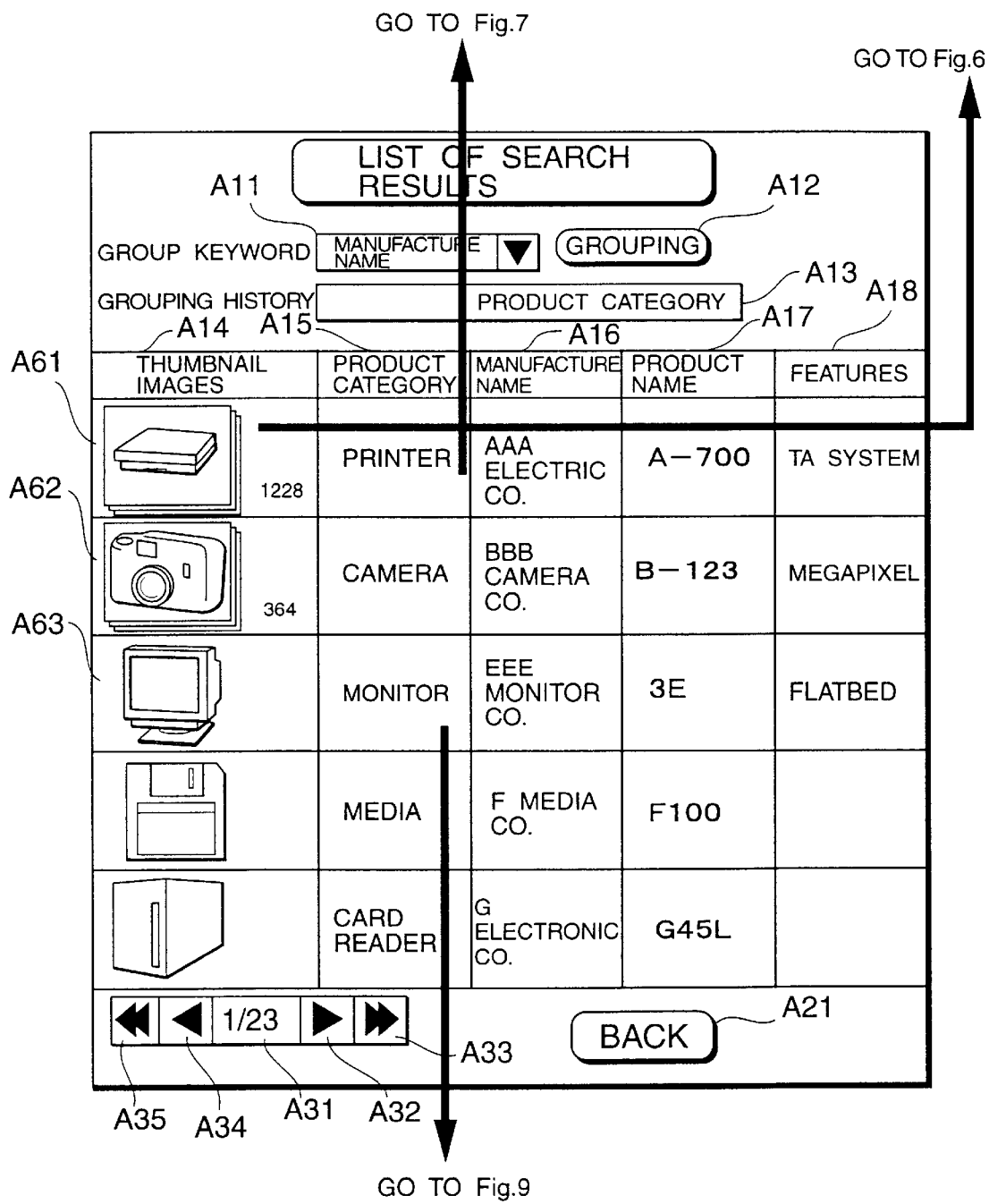

A search-result list window of the kind shown in FIG. 5 is displayed on the display unit of the client computer 1 (step 49).

The search-result list window shown in FIG. 5 displays areas identical with those of the search-result list window shown in FIG. 4. However, the thumbnail images displayed in the thumbnail image display area A14 are now representative images regarding data obtained as a result of the search that was conducted based upon the group keyword (product category) entered in the group keyword setting area A11 shown in FIG. 4. Displayed at the lower right of each thumbnail image is the number of hits of applicable data belonging to this product category.

A thumbnail image of the representative image of a printer is displayed in an area A61 as the product category. The number of hits regarding the printer is 1228, and the numerals "1228" are displayed at the lower right of this thumbnail image. Further, the thumbnail image displayed in the area A61 appears as if a plurality of images are superimposed on one another so as to indicate that there are numerous hits relating to the printer. By observing this thumbnail image displayed in area A61, the user can tell at a glance that there are a large number of printer-related hits conforming to the-search conditions.

Similarly, a thumbnail image of the representative image of a camera is displayed in an area A62 as the product category. Numerals indicating that the number of camera-related hits is 365 are displayed at the lower right of this thumbnail image. Here too the image is displayed so as to make it appear that a large number of images are displayed.

A thumbnail image of the representative image of a monitor is displayed in an area A63 as the product category. The number of hits regarding the monitor is one and therefore a display of the number of hits is omitted from area A63. It is of course permissible to display a numeral indicating that the number of hits is one. Unlike areas A61 and A62, the area A63 does not display an image in which numerous superimposed images appear, the reason being that the number of hits is only one.

The search-result list window shown in FIG. 5 is displayed also in a case where a product category is entered in the group keyword setting area A4 and the search area A6 is clicked in the search-condition setting window of FIG. 3 (steps 33, 36 and 37 in FIG. 11).

Figure 13:
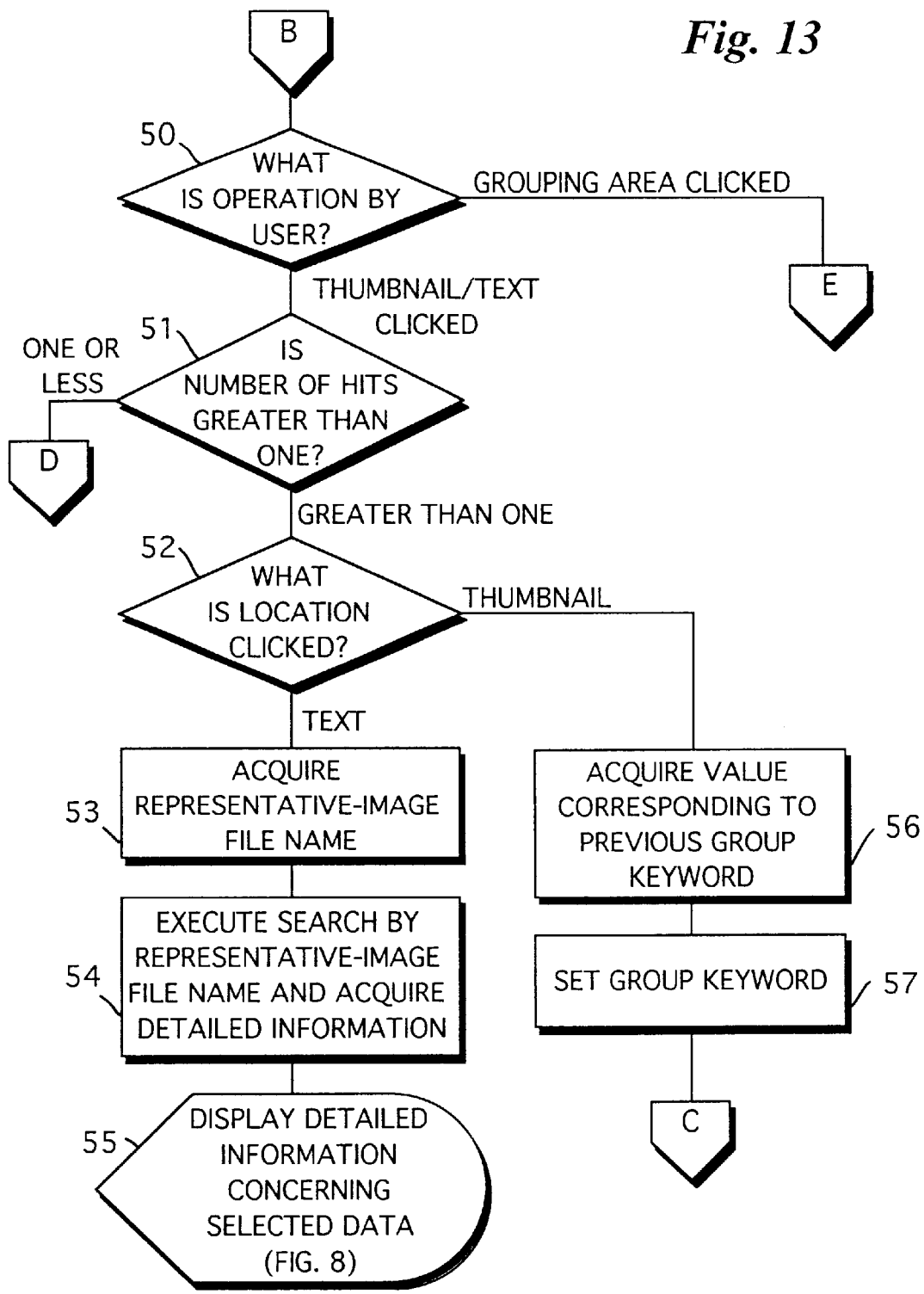
Figure 14:
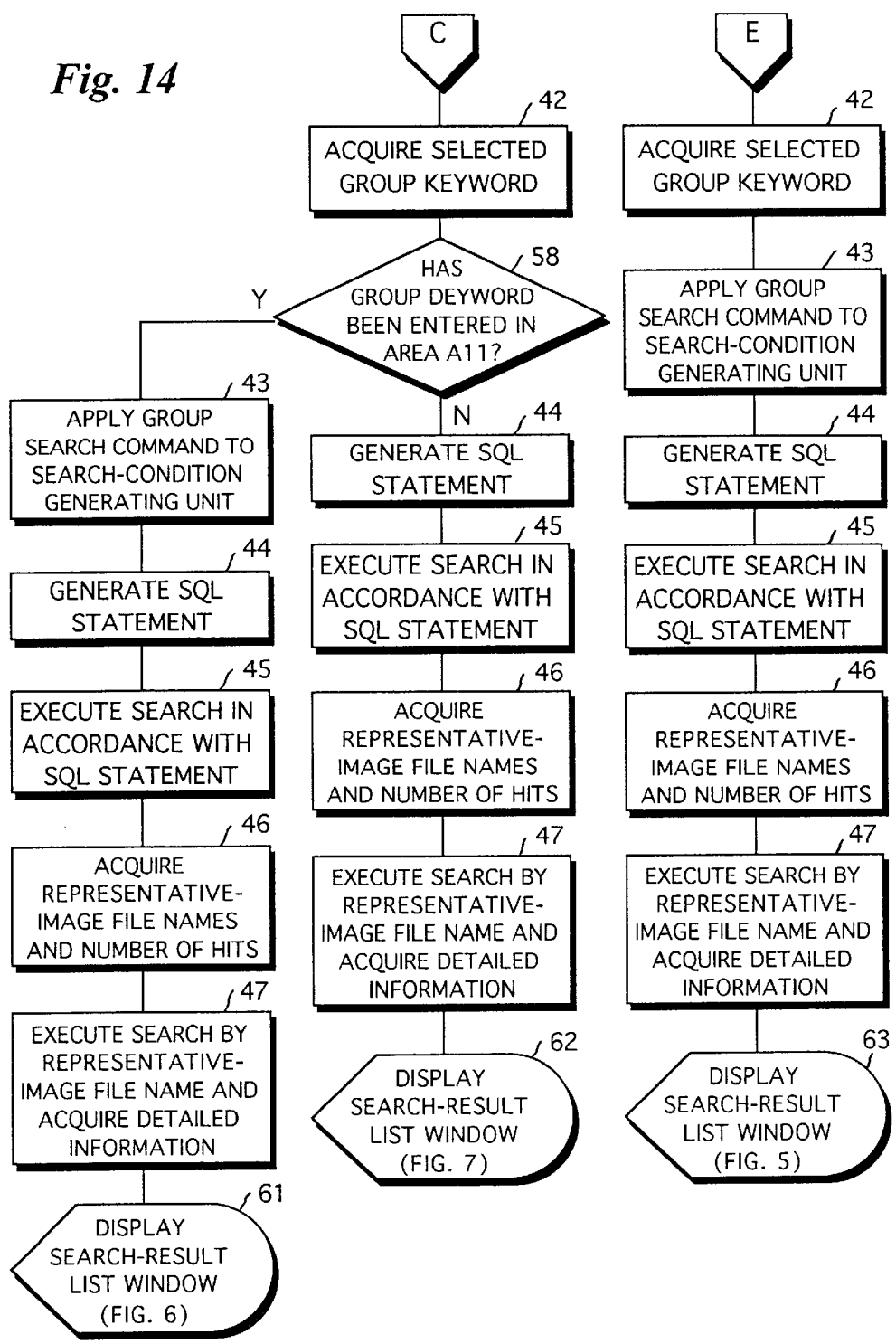

If a new group keyword is entered as the group keyword in the search-result list window of FIG. 5 and the grouping area A12 is clicked by the user of the client computer 1 (step 50 in FIG. 13), a grouping search is conduced based upon the new group keyword and a search-result list window of the kind illustrated in FIG. 5 is displayed again on the display unit of the client computer 1 (steps 42–47, step 63 in FIG. 14).

If a thumbnail image or corresponding text in the search-result list window of FIG. 5 is clicked by the user of the client computer 1 (step 50 in FIG. 13), it is determined whether the number of hits concerning the group to which the product specified by the clicked thumbnail image or text belongs is greater than one (step 51 in FIG. 13).

Figure 12:
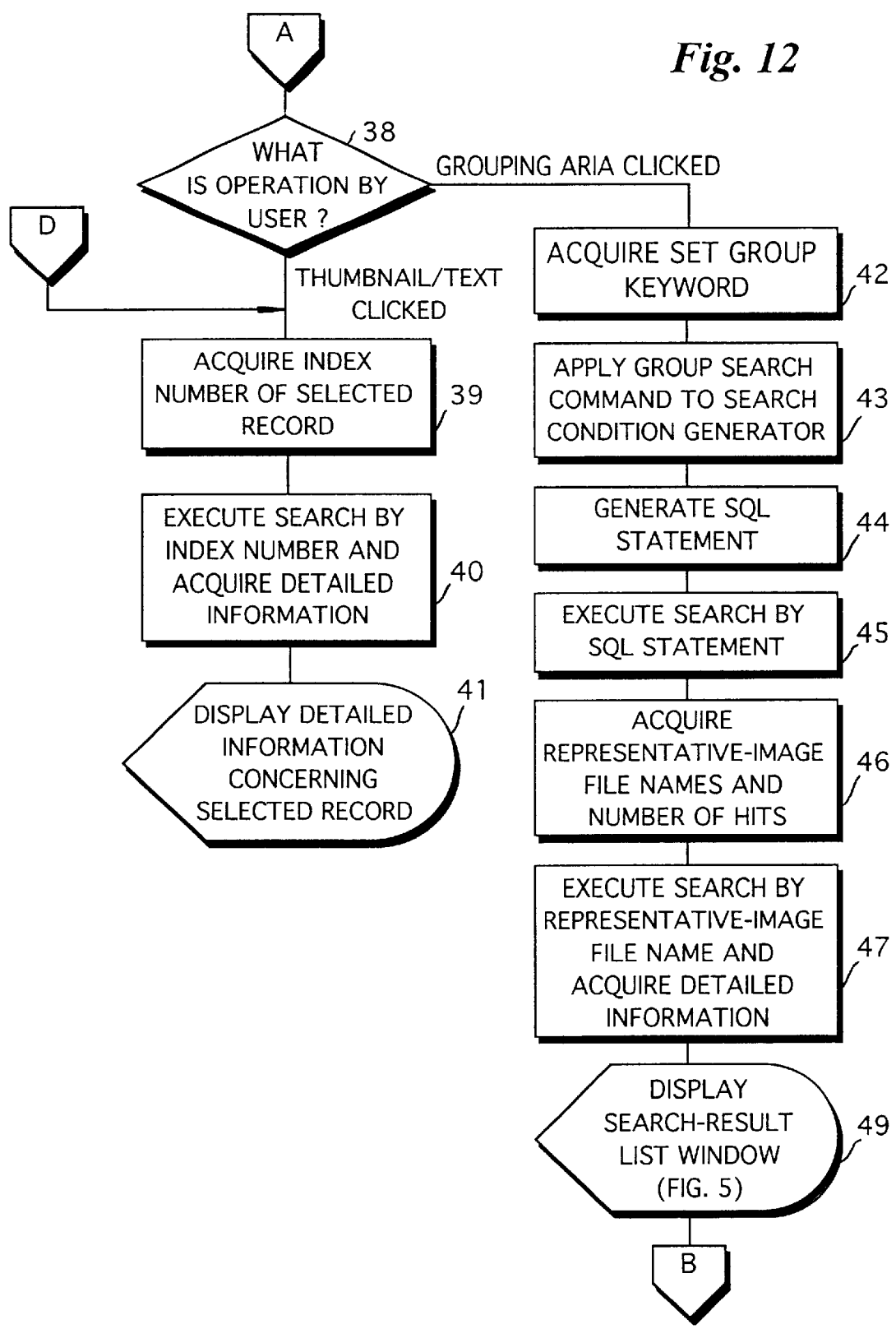

If the number of hits is one, the index number (or file name) of the applicable record (data) is acquired from the database 15 (step 39 in FIG. 12). Detailed information regarding the acquired index number (file name) is obtained from the database 15 (step 40 in Fig 12). The detailed information (see FIG. 9) regarding this applicable product is displayed on the display unit of the client computer 1 (step 41 in FIG. 12).

Figure 9:
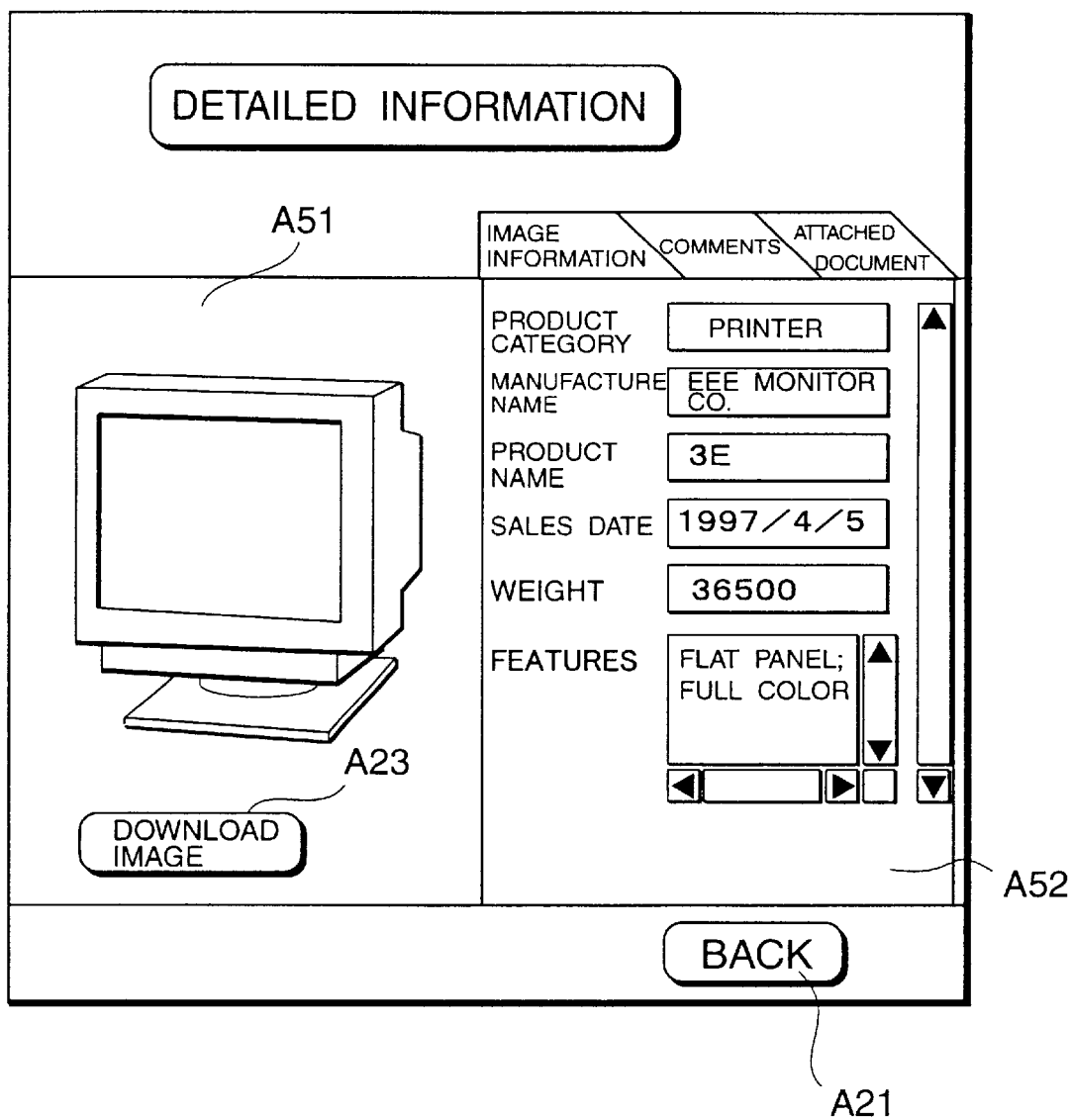
Figure 10:
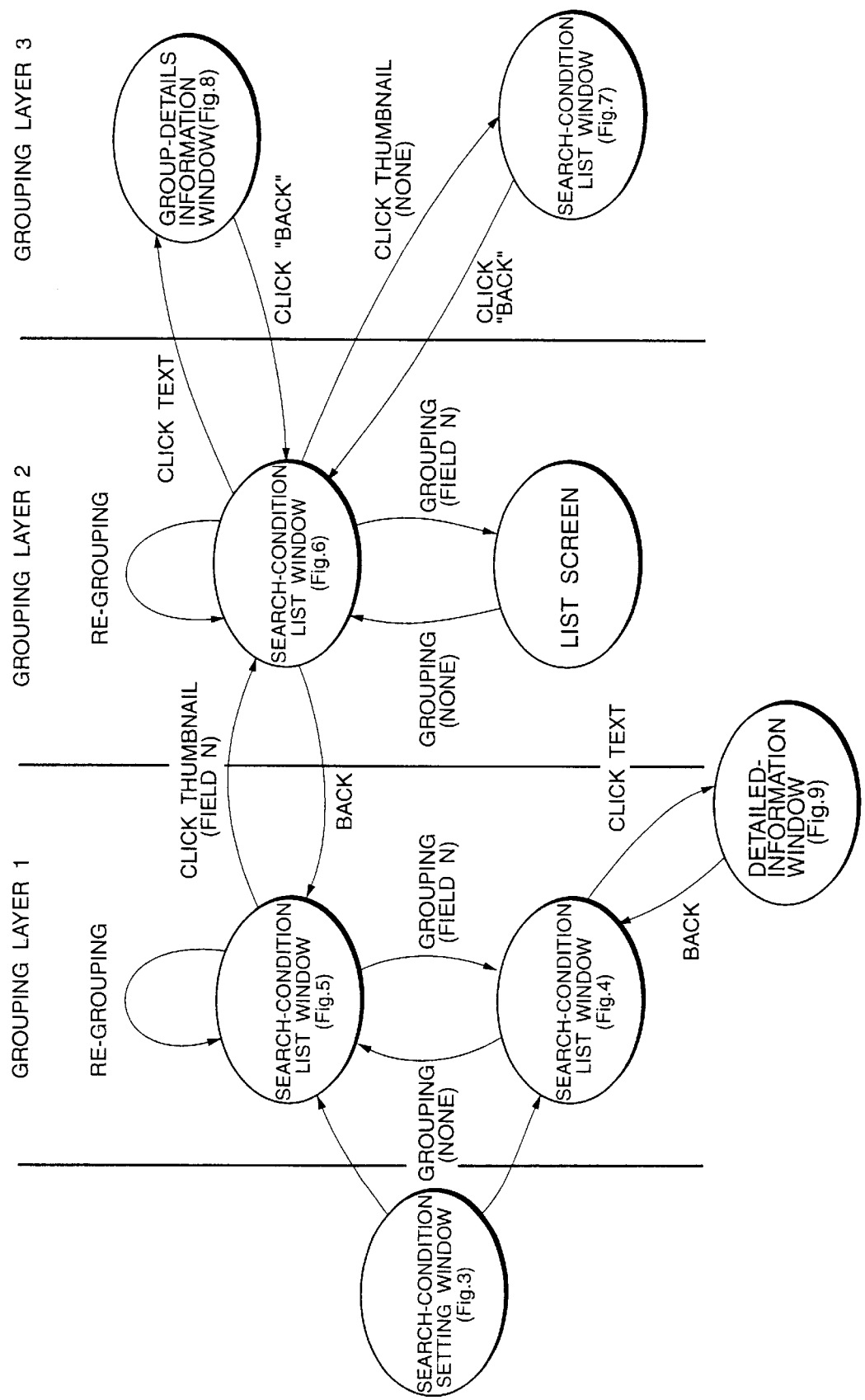
FIG. 10 is a status transition diagram showing the transition of windows displayed on the display unit of the client computer.

The detailed-information window shown in FIG. 9 includes an area A51 indicating the image of the product corresponding to clicked text, and an area A23 to be clicked when the image being displayed in the area A51 is downloaded from the image database system 10.

Further, the detailed-information window includes a feature area A52, a main area A22 and a "BACK" area A21.

Thus, the details of the product can be ascertained also by observing the detailed-information window shown in FIG. 9.

If the number of hits is greater than one, it is determined whether the location clicked is a thumbnail image or text (step 52 in FIG. 13).

If text has been clicked, the file name regarding the representative image of the group to which this text belongs and the immediately preceding group keyword (here the name of the manufacturer) are obtained from the database 15 (step 53 in FIG. 13). The database 15 is searched using the acquired file name and preceding group keyword, and detailed information concerning the acquired file name is obtained from the database 15 (step 54 in FIG. 13). A group details window shown in FIG. 8 is displayed on the display unit of the client computer 1 (step 55 in FIG. 13).

Figure 8:
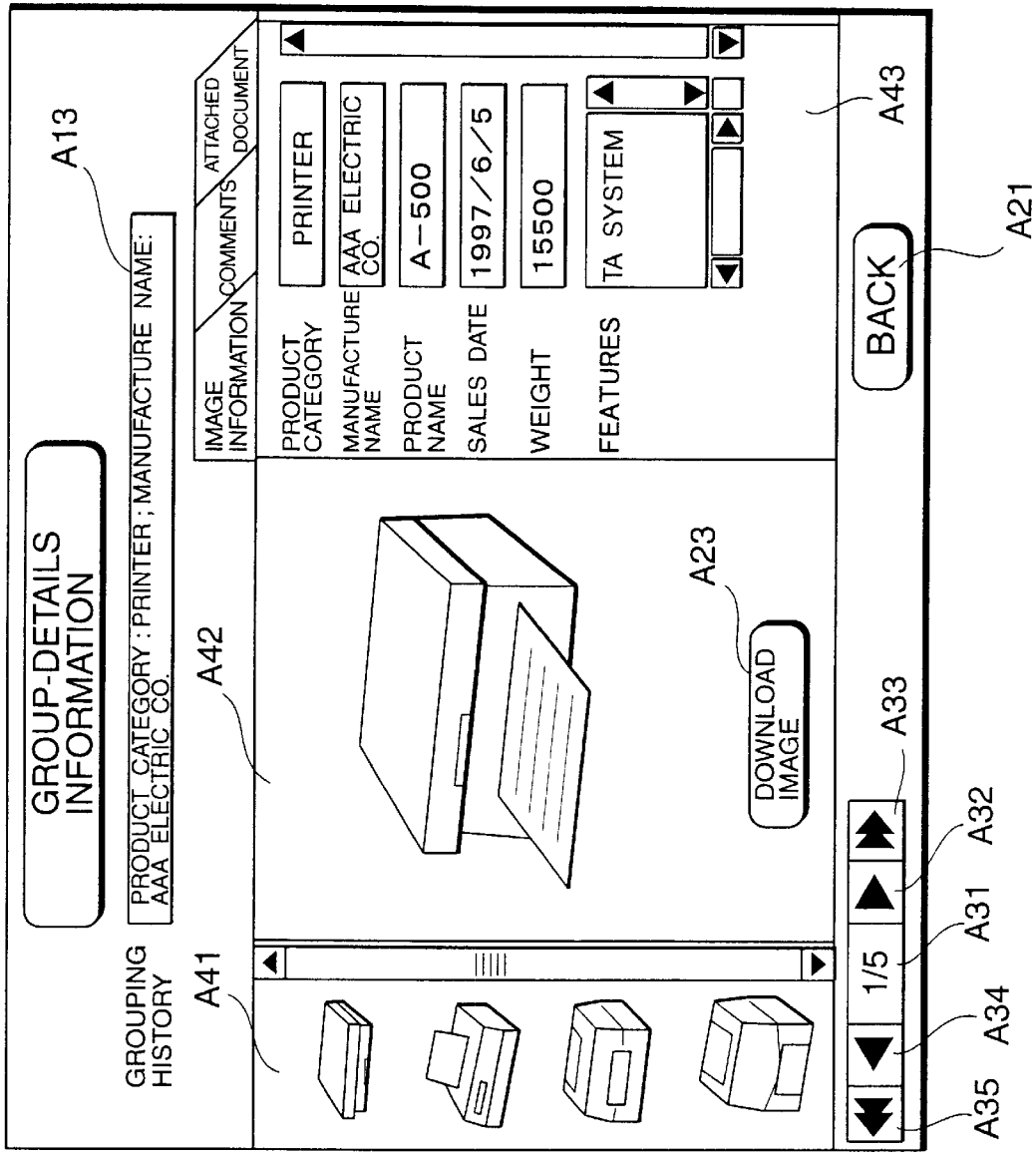

The group details window depicted in FIG. 8 includes the following areas:

Thumbnail-list Display Window A41:
This area displays a list of thumbnail images that belong to a group.

Image Display Area A42:
Among the images being displayed in the thumbnail-list display window A41, an image clicked by the user is displayed in this area.

Figure 6:
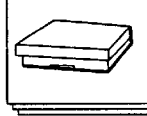

Feature Display Area A43:
This is an area for displaying the features of the image being displayed in the image display area A42. The various data being displayed in the field areas A15 to A19 as shown in FIGS. 4 to 6 is also displayed in this area.

Image Download Area A23:
This is an area clicked by the user of the client computer 1 when the image being displayed in the image display area A42 is to be downloaded from the image database system 10.

The group-details information window further includes the above-mentioned areas A31, A32, A33, A34 and A35.

Thus, by observing the group-detail information window, the user of the client computer 1 is capable of ascertaining the details of a product represented by a selected image.

If a thumbnail image in the search-result list window shown in FIG. 5 is clicked (step 52 in FIG. 13), the group keyword entered previously is read from the grouping history (step 56 in FIG. 13) and the read group keyword is set in the client computer 1 as a search condition (step 57 in FIG. 13). The read group keyword is applied to the image file processing unit of the image database system 10 (step 42 in FIG. 14).

It is determined whether a group keyword has been entered in the group keyword setting area A11 (step 58 in FIG. 14).

If a group keyword has been entered, a grouping search in accordance with this group keyword is conducted (steps 43 to 47 in FIG. 14) and, as a result, a search-result list window shown in FIG. 6 is displayed on the display unit of the client computer 1 (step 61 in FIG. 14).

Images obtained as a result of the grouping search specified by the manufacturer name as the group keyword are displayed in the thumbnail image display area A14 of the search-result list window shown in FIG. 6. If a thumbnail image being displayed in the thumbnail image display area A14 involves numerous hits, then, in a manner similar to that of FIG. 5, the image is displayed to make it appear that there are numerous images. If there are a plurality of hits, then the number of hits is displayed.

"Product Category: Printer" is displayed as the grouping history in the search-result list window shown FIG. 6.

If a thumbnail image being displayed in the thumbnail image display area A14 of the search-result list window shown in FIG. 6 is clicked by the user of the client computer 1 and this thumbnail image has a plurality of hits associated with it, a search-result list window of the kind shown in FIG. 7 is displayed. This window displays, in the form of a list, thumbnail images of images representing a plurality of the hits. If text in the search-result list window shown in FIG. 6 is clicked by the user of the client computer 1, then the group details information window shown in FIG. 8 is displayed.

Thus, images desired by the user of the client computer 1 are displayed in the form of a list in the search-result list window shown in FIG. 7. Since the number of thumbnail images have been narrowed down, a desired image can be found comparatively simply.

The window shown in FIG. 7 is displayed also if the grouping area A12 is clicked with "NONE" having been entered in the group keyword setting area A11 when the window depicted in FIG. 5 is being displayed (step 50 in FIG. 13 and steps 42 to 63 in FIG. 14).

FIG. 16 illustrates an example of a search-result list window displayed on the display unit of the client computer 1. FIG. 16 corresponds to FIG. 4.

Here the number of hits resulting from a search is displayed at the lower right of a thumbnail image displayed in an area A71 contained in the thumbnail image display area A14 included in the search-result list window. The thumbnail image displayed in the area A71 is formed to have many frames FL so as to make it appear that numerous images are superimposed on one another in order that the user may tell at a glance that there are many hits in the search results.

Further, a thumbnail image being displayed in an area A72 is formed to a few frames FL so as to make it appear that a plurality of frames are superimposed on one another in order that the user may tell at a glance that the number of hits in the search results is not one but several.

A thumbnail image being displayed in an area A73 is displayed as a single thumbnail image so as to indicate that the number of hits in the search results is one.

A thumbnail image displayed in an area A74 appears as if somewhat many images are superimposed on one another so as to indicate that the hits are somewhat numerous.

Thus, merely by looking at the thumbnail images displayed in the thumbnail image display area A14, the user can tell the approximate number of hits associated with each thumbnail image.

Figure 17:
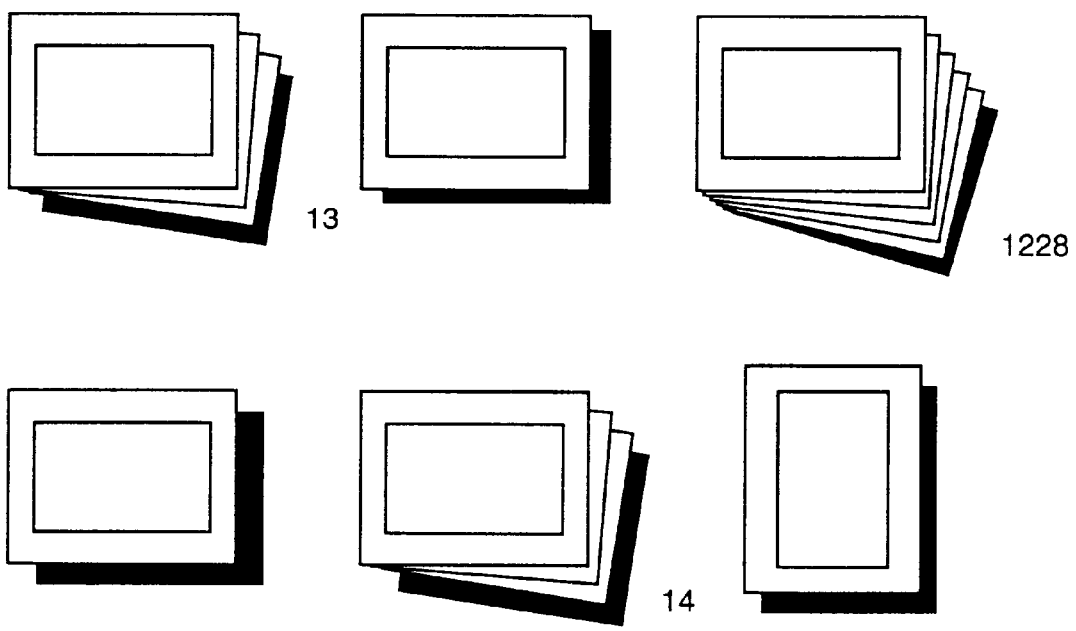
FIG. 17 illustrates examples of thumbnail images.

FIG. 17 illustrates examples of thumbnail images.

A thumbnail image is generated by combining a prescribed representative image with a template image.

Image data representing a template image has been stored in the template file unit 20 of the image database system 10 in the manner described above.

The aspect ratio of a template image changes in conformity with the aspect ratio of a representative image obtained as the result of a search. Further, the orientation of a template image also changes in dependence upon whether the representative image is displayed with a vertical orientation or a horizontal orientation.

Thus, a thumbnail image is displayed in the thumbnail image display area A14 upon adjusting the aspect ratio and orientation of the template image.

Figure 18A:
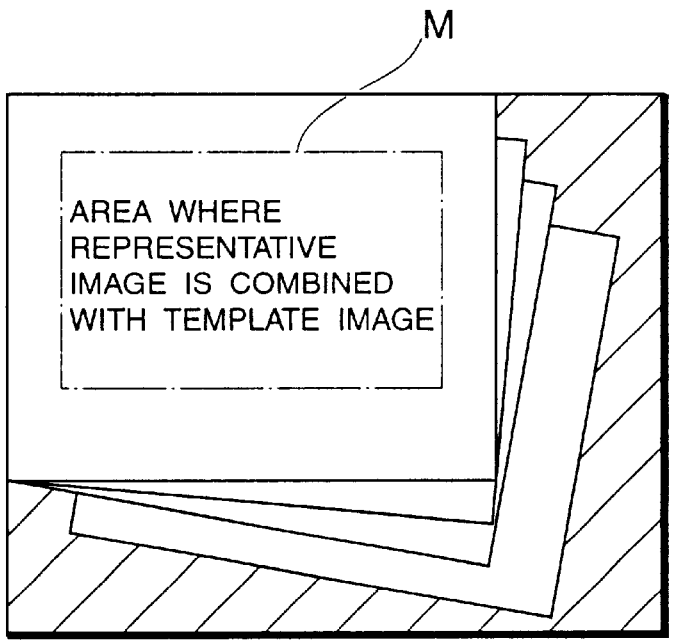
FIGS. 18a and 18b illustrate examples of template images.
Figure 18B:
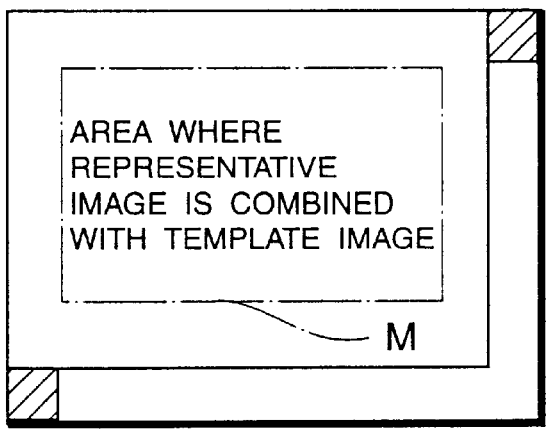

FIGS. 18a and 18b illustrate examples of template images.

FIG. 18a shows an example of a template image used in an image displayed in the thumbnail image display area A14 when numerous hits are obtained by a database search.

FIG. 18b shows an example of a template image used in an image displayed in the thumbnail image display area A14 when only one hit is obtained by a database search.

In this embodiment, part (indicated by the hatching) of a template image is filled in with the background color of the thumbnail image display area A14. As a result, the representative image appears three-dimensionally and can be prevented from becoming too conspicuous in comparison with the background. area M at which the representative image is combined with the template image is indicated by the phantom lines in both FIGS. 18a and 18b.

Figure 19:
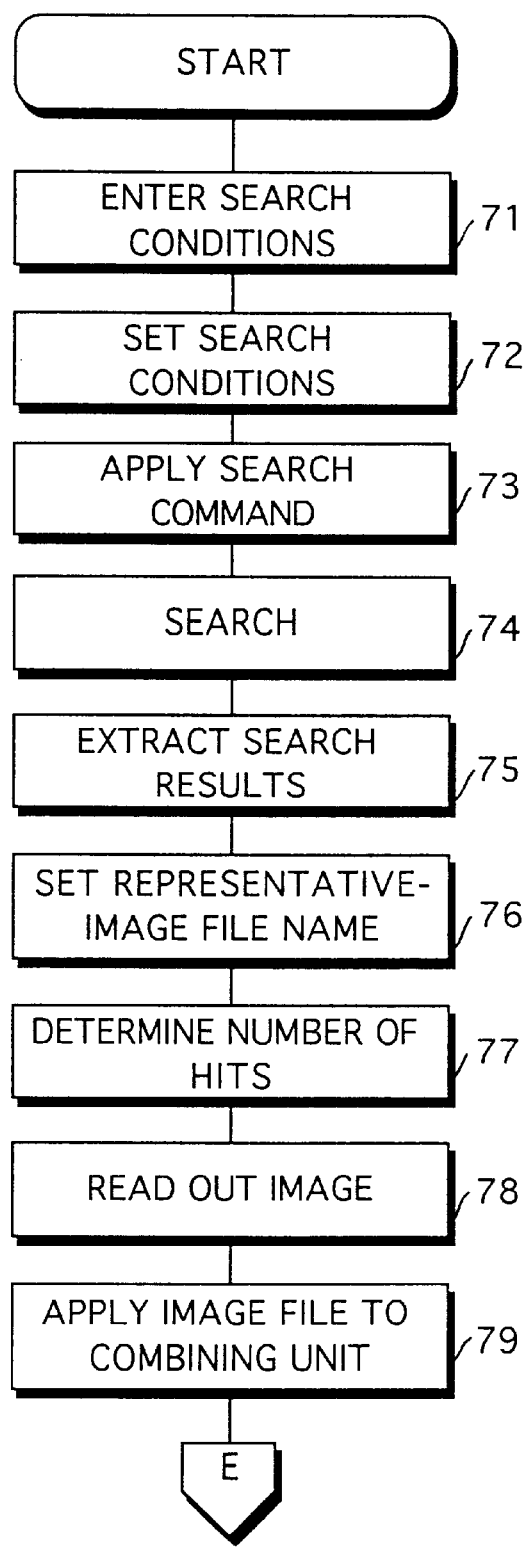
FIGS. 19 and 20 are flowcharts illustrating processing up to display of thumbnail images.
Figure 20:
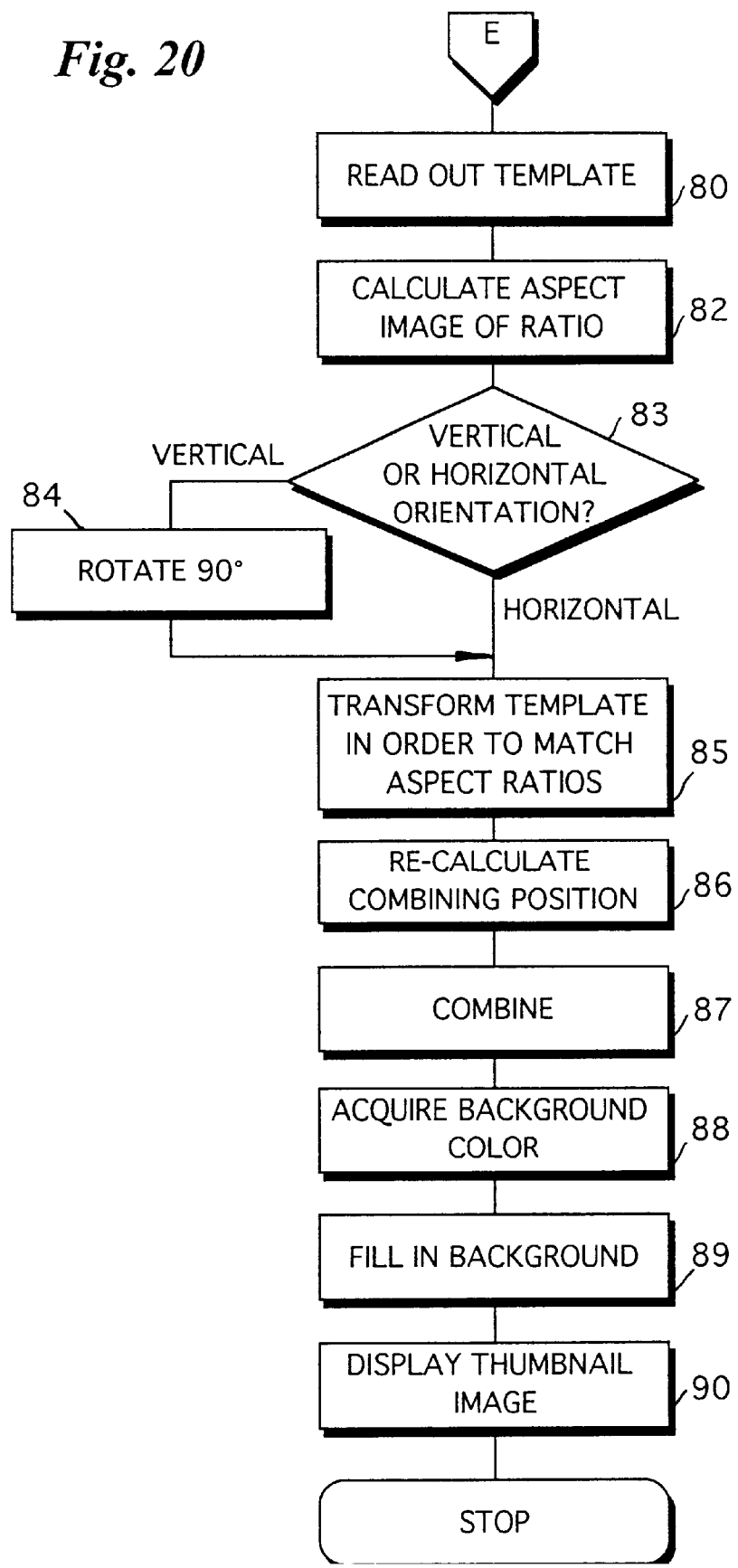

FIGS. 19 and 20 are flowcharts illustrating processing up to display of a thumbnail image in the thumbnail image display area A14 of FIG. 16.

As mentioned above, search conditions are entered from the client computer 1 (step 71). The data representing the entered search conditions are transmitted from the client computer 1 to the image database system 10.

The data representing the search conditions are applied to the image file processing unit 13, which is included in the image database system 10, whereby the search conditions are set (step 72). The image file processing unit 13 applies a database search command to the database controller 14 (step 73). An SQL statement is generated in the search-condition generating unit 22 and a search of the database 15 is conducted (step 74).

The number of hits and the names of representative image files obtained by the search of the database 15 are applied to the Web server 11 via the image file processing unit 13 by the database controller 14 (step 75).

The image file names representing the representative images and the number of hits resulting from the database search are set in the image file controller 16 by the image file processing unit 13 in accordance with the results of searching the database 15 (step 76).

The image file controller 16 determines whether the number of hits resulting from the database search is two or more (step 77).

An image file having an image file name that has been set in the image file controller 16 is read out of the image file unit 17 (step 78). The image file that has been read out is applied to the image+template combining unit 18 (step 79).

If the result of the database search is that the number of hits is two or more, template image data for expressing a plurality of hits of the kind shown in FIG. 18a is read out of the template file unit 20. If the number of hits is one, template image data for expressing a single hit of the kind shown in FIG. 18b is read out of the template file unit 20 (step 80).

The image+template combining unit 18 calculates the aspect ratio of the representative image represented by the image file that has been read out of the image file unit 17 (step 82).

It is determined whether the image to be combined with the template image will be displayed with a vertical orientation or a horizontal orientation (step 83). If the image will be displayed in the vertical orientation, the image is rotated 90° in the clockwise direction (step 84).

Transformation processing is executed by the image +template combining unit 18 in such a manner that the calculated aspect ratio of the representative image and the aspect ratio of the template image will agree (step 85). The position on the template image at which the representative image is combined with the template image is calculated (step 86) and then the representative image is combined with the template image (step 87).

The background color of the thumbnail image display area A14 in the search-result list window is obtained from the HTML file background color management unit 19 (step 88). As mentioned above, the thumbnail image is subjected to fill processing in such a manner that the color of part of the area thereof becomes the same as the background color (step 89).

If a thumbnail image is thus generated, data representing the thumbnail image is transmitted from the image database system 10 to the client computer 1. Thus, a thumbnail image obtained by combining a representative image with a template image whose shape conforms to the number of hits in the database 15 is displayed in the thumbnail image display area A14 of the search-result list window displayed on the display unit of the client computer 1 (step 90).

In the examples of FIGS. 18a and 18b, two types of template images are illustrated. However, by preparing templates of a large number of types and selecting templates in dependence upon the number of hits, thumbnail images of template images conforming to the number of hits can be displayed in the manner shown in FIG. 16.

As many apparently widely different embodiments of the present invention can be made without departing from the spirit and scope thereof, it is to be understood that the invention is not limited to the specific embodiments thereof except as defined in the appended claims.

What is claimed is:

1. A database search apparatus comprising:

a group keyword input unit for inputting a group keyword;

a search unit responsive to a group keyword, which has been input by said group keyword input unit, for searching a database in which numerous items of data have been stored and finding representative image data that represents a representative image of extracted data; and a representative-image display control unit for displaying, on a display unit, the representative image represented by the representative image data found by said search unit, wherein data extracted by said search unit comprises a plurality of items of data and wherein said representative image is representative of a group of items within said plurality of items of data, wherein the representative image indicates that the number of items within said group of items in the extracted data is plural, is displayed on said display unit.

2. The apparatus according to claim 1, further comprising a count-display control unit for displaying, on said display unit, a count of the items of data extracted by said search unit.

3. The apparatus according to claim 2, wherein when the count is plural, said count-display control unit displays this count on said display unit.

4. The apparatus according to claim 1, further comprising a first related-information display control for displaying information related to the representative image on said display unit in association with said representative image.

5. The apparatus according to claim 1, further comprising an image display control unit responsive to clicking of the representative image for displaying, on said display unit, an image corresponding to data represented by this representative image.

6. The apparatus according to claim 1, further comprising:

a group-details display command unit for designating a group for which group details are to be displayed; and a list display control unit responsive to the designation by said group-details display command unit for displaying, in list form, images corresponding to data belonging to the designated group.

7. The apparatus according to claim 6, comprising a second related-information display control unit for displaying, on said display unit, information related to the images displayed in list form image.

8. A database search apparatus comprising:

a search condition input unit for inputting search conditions;

a search unit for searching a database, in which numerous items of data have been stored, in accordance with search conditions that have been input from said search condition input unit;

a display control unit for displaying, on a display unit, a representative image representing results of searching the database by said search unit; and a unit for changing the form of the representative image in dependence upon the results of searching the database by said search unit, wherein data extracted by said search unit comprises a plurality of items of data and wherein said representative image is representative of a group of items within said plurality of items of data, wherein the representative image indicates that the number of items within said group of items in the extracted data is plural, is displayed on said display unit.

9. The apparatus according to claim 8, wherein the representative image consists of a template image and an image pasted on the template image;

said apparatus further comprising a color conversion unit for applying color conversion processing to the template image in such a manner that color of part of the area of the template image becomes the same as a background color.

10. A database search method comprising:

inputting a group keyword;

searching, in response to input of a group keyword, a database in which numerous items of image data have been stored and finding representative image data that represents a representative image of extracted data; and displaying, on a display unit, the representative image represented by the representative image data found, wherein data extracted during said searching comprises a plurality of items of data and wherein said representative image is representative of a group of items within said plurality of items of data, wherein the representative image indicates that the number of items within said group of items in the extracted data is plural, is displayed on said display unit.

11. A database search method comprising:

inputting search conditions;

searching, in accordance with search conditions that have been input, a database in which numerous items of data have been stored;

displaying, on display unit, a representative image representing results of searching the database; and changing the form of the representative image in dependence upon the results of searching the database, wherein data extracted during said searching comprises a plurality of items of data and wherein said representative image is representative of a group of items within said plurality of items of data, wherein the representative image indicates that the number of items within said group of items in the extracted data is plural, is displayed on said display unit.

* * * * *